United States Patent [19]
Hiraoka

[11] Patent Number: 5,912,025
[45] Date of Patent: Jun. 15, 1999

[54] CONTROL DEVICE FOR MOTOR-DRIVEN INJECTION MOLDING MACHINE CAPABLE OF GENERATING LARGER CLAMPING FORCE

[75] Inventor: Kazuo Hiraoka, Chiba, Japan

[73] Assignee: Sumitomo Heavy Industries, Ltd., Tokyo, Japan

[21] Appl. No.: 08/870,492

[22] Filed: Jun. 6, 1997

[51] Int. Cl.⁶ .................................................. B29C 45/66
[52] U.S. Cl. .......................... 425/167; 425/149; 425/595
[58] Field of Search ................................. 425/149, 150, 425/167, 593, 595

[56] References Cited

U.S. PATENT DOCUMENTS

| | | | |
|---|---|---|---|
| 5,052,908 | 10/1991 | Inaba et al. | 425/150 |
| 5,059,365 | 10/1991 | Hertzer et al. | 425/150 |
| 5,149,471 | 9/1992 | Catanzaro et al. | 425/149 |
| 5,164,203 | 11/1992 | Tanaka et al. | 425/149 |
| 5,540,577 | 7/1996 | Ishikawa et al. | 425/150 |

FOREIGN PATENT DOCUMENTS

| | | |
|---|---|---|
| 0 436 732 A1 | 7/1991 | European Pat. Off. . |
| 0 700 768 A1 | 3/1996 | European Pat. Off. . |
| 43 45 034 A1 | 10/1994 | Germany . |
| 63-262221 | 10/1988 | Japan . |
| 2-188177 | 7/1990 | Japan . |
| 4-121470 | 4/1992 | Japan . |
| 2 218 003 | 11/1989 | United Kingdom . |

*Primary Examiner*—James P. Mackey
*Attorney, Agent, or Firm*—Burns, Doane, Swecker & Mathis, L.L.P.

[57] ABSTRACT

In a control device for a motor-driven injection molding machine comprising a mold clamping system which comprises a servo-motor and a ball screw mechanism, the ball screw mechanism comprises a screw shaft and a nut for use in converting rotation of the servo-motor into rectilinear motion. The control device comprises a pattern generator for generating a set pattern for the clamping force. The mold clamping system generates a clamping force according to the set pattern and a maximum clamping force with the set pattern being determined to be larger than the clamping force that is generated by the servo-motor within predetermined ratings.

7 Claims, 3 Drawing Sheets

CONTROL DEVICE FOR MOTOR-DRIVEN INJECTION MOLDING MACHINE CAPABLE OF GENERATING LARGER CLAMPING FORCE

BACKGROUND OF THE INVENTION

The present invention relates to a mold clamping system of a motor-driven injection molding machine. More particularly, the present invention relates to a control device for a mold clamping system used for carrying out a clamping process with a toggle mechanism that is driven by a servo-motor.

A mold clamping system in an injection molding machine comprises a servo-motor, a ball screw, and a toggle mechanism. The servo-motor has a predetermined rated torque. The ball screw has a screw shaft and a nut to convert rotation of the servo-motor into rectilinear motion. The rotation of the servo-motor is transmitted to the screw shaft. In response to this, the screw shaft rotates and the nut moves forward, allowing the toggle mechanism to achieve clamping.

Molding of resins typically involves a plurality of processes, i.e., dispensing of resin, filling, dwelling, and cooling. Besides these processes, the mold clamping system carries out a clamping process. In the mold clamping system, a torque of the servo-motor is controlled during the clamping process in order to provide a clamping force of which a profile exhibits a predetermined pattern or patterns.

The time required for the clamping process may vary depending on the product to be molded. For example, it may take an hour for the clamping process to mold a lens. Under such circumstances, a conventional mold clamping system determines a rated torque for the servo-motor based on a maximum clamping force required for the molded product. This means that a rated power of the servo-motor used for the mold clamping system is determined so that it is capable of generating the maximum clamping force without exceeding its predetermined power rating. However, the maximum clamping force does not last for a long time in typical mold clamping systems, except for those designed for a special purpose as described above. In other words, the time during which the maximum clamping force is required accounts for a small proportion of the time for the entire clamping process.

SUMMARY OF THE INVENTION

Accordingly, an object of the present invention is to provide a control device for a motor-driven injection molding machine in which a clamping force is generated by intentionally exceeding the predetermined power rating of the servo-motor.

The present invention is applicable to a control device for a motor-driven injection molding machine that comprises a mold clamping system having a servo-motor and a ball screw mechanism in which the ball screw mechanism comprises a screw shaft and a nut for use in converting rotation of the servo-motor into rectilinear motion.

According to an aspect of the present invention, the control device comprises a pattern generator for generating a set pattern for the clamping force. The mold clamping system generates a clamping force according to the set pattern. A maximum clamping force within the set pattern is larger than the clamping force which can be generated by the servo-motor without execeding its predetermined rating.

DESCRIPTION OF THE PREFERRED EMBODIMENT

Figure 1:
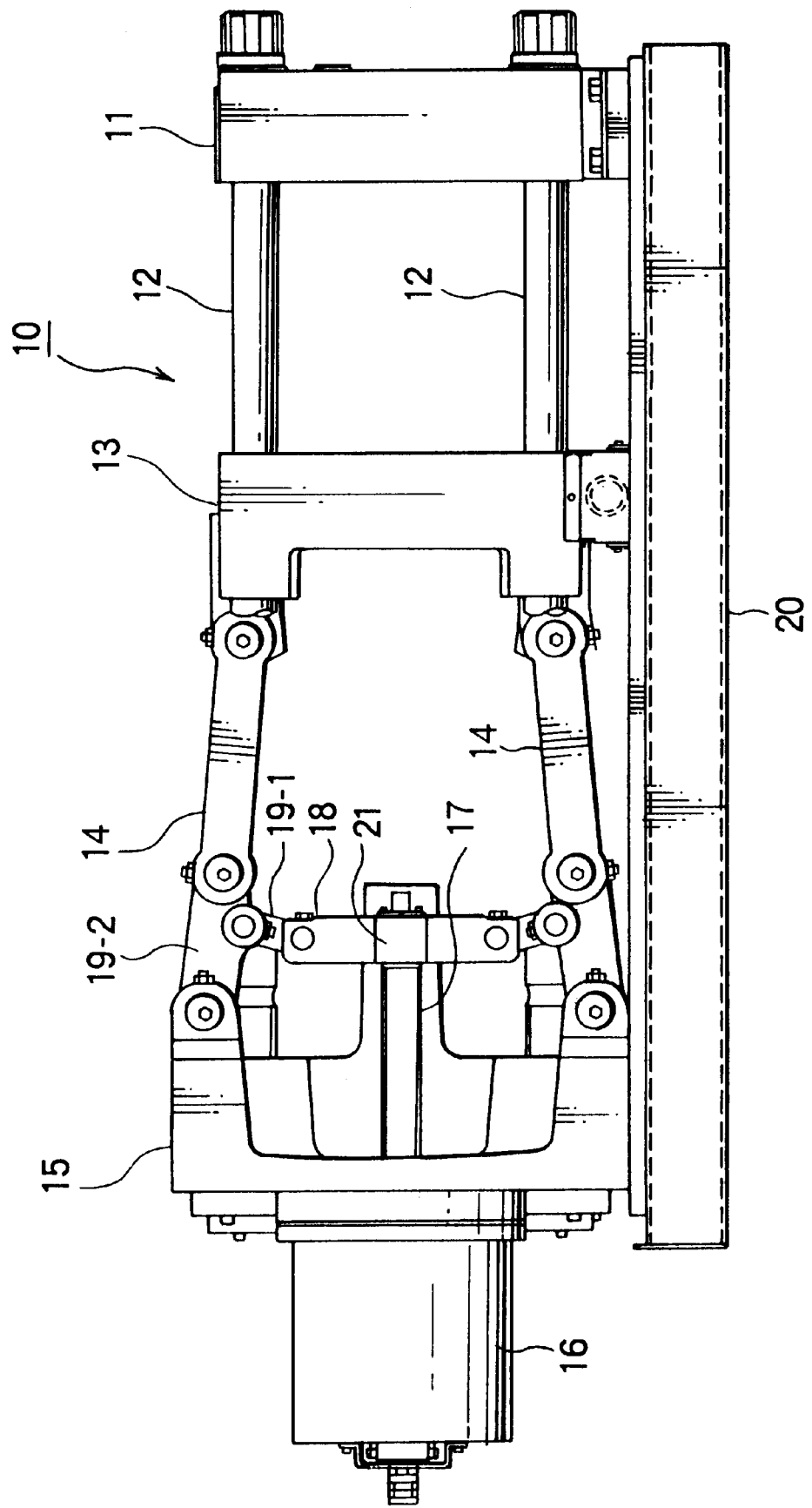
FIG. 1 is a view illustrating a structure of the essentials of a mold clamping system to which the present invention is applied.
Figure 2:
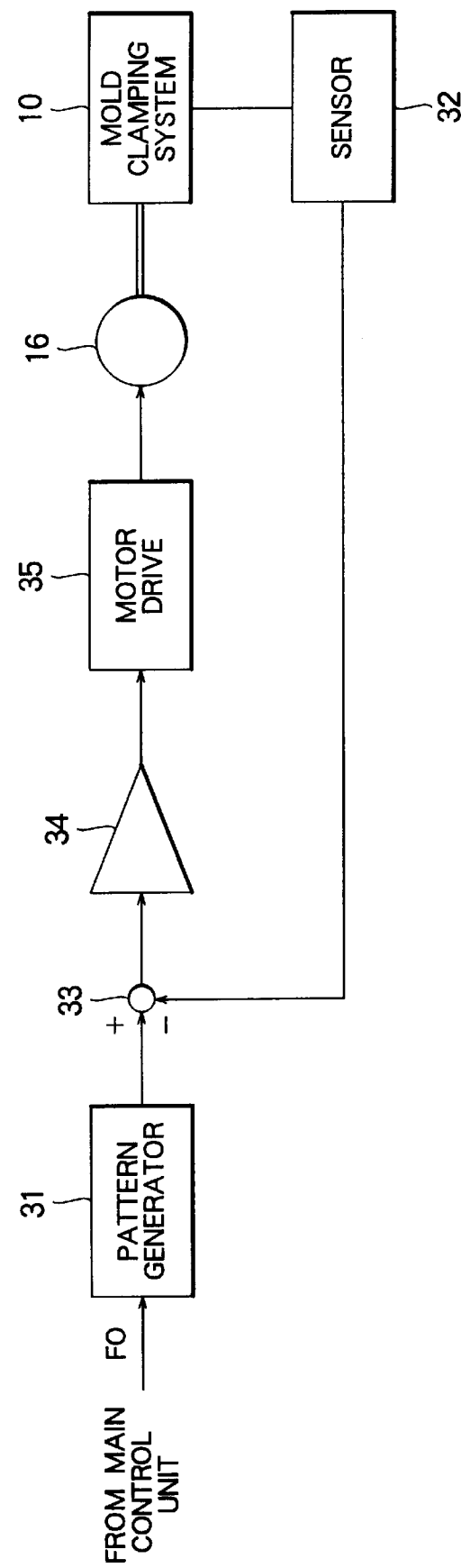
FIG. 2 is a block diagram illustrating a structure of a control device for a mold clamping system according to the present invention.

Referring to FIG. 1, a mold clamping system of a motor-driven injection molding machine is described, to which the present invention is applied. In FIG. 1, a mold clamping system 10 comprises a fixed platen 11, four tie bars 12, a movable platen 13, two arms 14, a toggle support 15, a servo-motor 16, a screw shaft 17, a cross head 18, a first toggle lever 19-1, and a second toggle lever 19-2. Only two tie bars 12 are illustrated in FIG. 2. A toggle mechanism is formed of the two arms 14, the toggle support 15, the cross head 18, and the first and the second toggle levers 19-1 and 19-2. While not illustrated, the fixed and the movable platens 11 and 13 are attached to fixed and movable molds, respectively, such that they are opposed to each other. The fixed platen 11 is securely fixed to a base plate 20. The movable platen 13 slides on the four tie bars 12 depending on the position of the two arms 14.

Rotation of the servo-motor 16 is transmitted to the screw shaft 17. A nut 21 is thread-engaged with the screw shaft 17. Rotation of the screw shaft 17 results in forward movement of the nut 21, which causes the toggle mechanism to achieve the clamping operation.

Figures 3, 4:
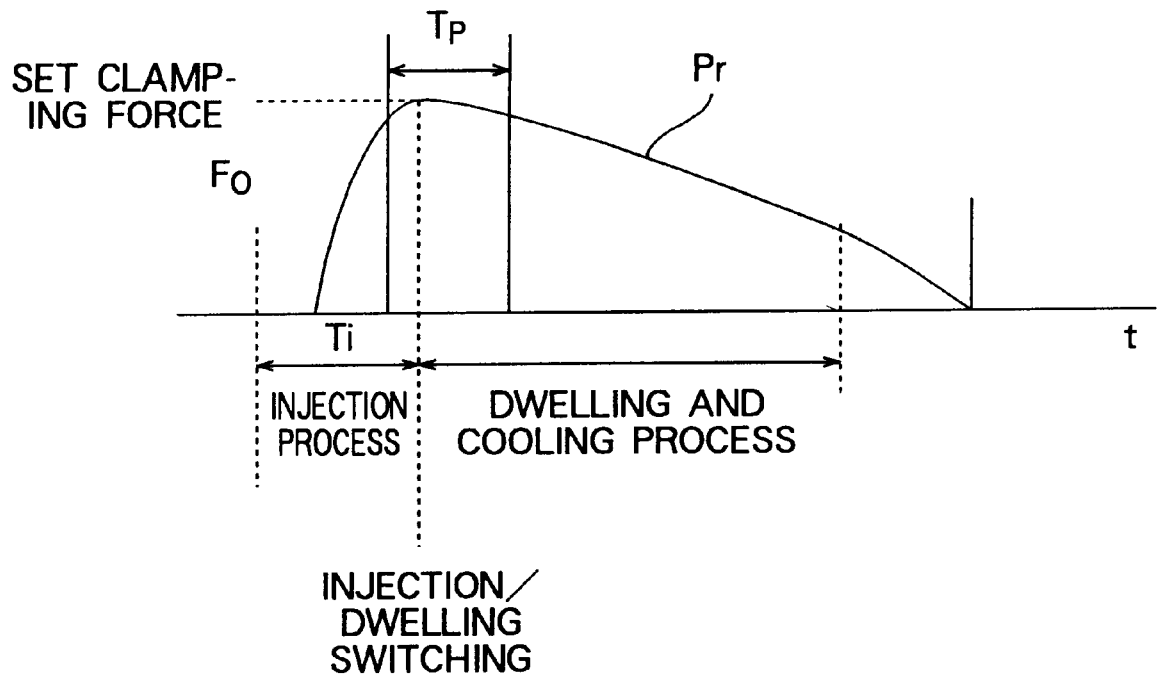
FIG. 3 is a view showing an example of a set pattern generated by a set pattern generator illustrated in FIG. 2.
FIG. 4 is a view illustrating an example of a table that is prepared in a memory to calculate the clamping force according to the set pattern illustrated in FIG. 3.

Referring to FIG. 2, a control device for a mold clamping system according to a preferred embodiment of the present invention is described. The control device comprises a pattern generator 31. In response to a set clamping force F0, the pattern generator 31 generates a set pattern Pr as illustrated in FIG. 3 according to the set clamping force F0. The set clamping force F0 is supplied from a main control unit (not shown) for the motor-driven injection molding machine. The pattern generator 31 produces a command signal indicative of a command value in accordance with the set pattern Pr generated. The control device further comprises a sensor 32 for use in sensing the clamping force generated by the mold clamping system. The sensor 32 produces a sensed clamping force signal indicative of the sensed clamping force. A subtracter 33 calculates a difference between the command signal supplied from the pattern generator 31 and the sensed clamping force signal obtained by the sensor 32. The subtracter 33 then supplies a calculated difference signal indicative of the difference to an amplifier 34. The amplifier 34 has functions including PID compensation. The amplifier 34 amplifies the calculated difference signal and produces a torque instruction signal indicative of an instructed torque value for the servo-motor 16. A motor drive 35 drives the servo-motor 16 in accordance with the instructed torque value provided by the amplifier 34.

The mold clamping system to which the present invention is applied is of the same general type as the one illustrated in FIG. 1. However, the mold clamping system and mold control system of the present invention makes it possible to use a mold clamping system with a conventional servo-motor having a maximum power rating capable of producing a maximum clamping force of, for example, 50 tons, and exceed the maximum power rating of the servo-motor for a specified period of time thereby producing a maximum clamping force which exceeds, for example, 50 tons, for the specified period of time. of the injection process and is increased rapidly. The clamping force then reaches a peak (set clamping force F0) immediately after switching from the injection process to the dwelling process. From that point the clamping force is gradually decreased. A time interval Tp during which the maximum clamping force is present accounts for a significantly small proportion of the time for the entire clamping process.

The present invention makes it possible to provide the maximum clamping force above by exceeding the predetermined rating of the servo-motor.

The pattern generator 31 has a memory (not shown). The memory stores the set pattern Pr shown in FIG. 3 in the form of a table of data points as illustrated in FIG. 4. In FIG. 4, a symbol x indicates the number of table entries of 0, . . . , K, . . . , and n. Each table entry indicates the time elapsed after the beginning of the injection process. K and n are each a natural number and a numerical value between 100 and 1000 is typically given for n. In other words, the table number is set for each Tw/1000 seconds when n is equal to 1000 and the time interval is Tw seconds from the beginning of the injection process to the point when the clamping process completes and the clamping force becomes zero. A symbol y is a profile value that is given by a numerical value between 0 and 1. The profile value is obtained by means of converting the clamping force corresponding to each table number x, with the assumption that the set clamping force F0 is a reference value 1 to define the maximum clamping force.

It is assumed that the injection process time is Ti and that the elapsed time from the beginning of the injection process is t. The table number x for use in looking up the profile value y on the table in FIG. 4 is then given by the equation: x=K*t/Ti, where K is the table number when t=Ti. The table number x obtained with the above equation may be a value having one decimal range. In such a case, the decimal range should be interpolated. The set clamping force Fr obtained at any point from the beginning of the injection is given by the following equation:

$$Fr=\{[y(X)-y(X-1)]*(x-X)+y(X-1)\}*F0,$$

where X is obtained by truncating the figures of x below 1.

The pattern generator 31 reads, one by one, the clamping force defined by the set pattern out of the memory. The pattern generator 31 produces the read clamping force as a command value. The motor drive 35 controls the torque of the servo-motor in accordance with the command value. This results in the control of the clamping force. The servo-motor 16 generates the maximum clamping force above its ratings for the short time interval of Tp. Such overloading for the short time interval of Tp is considered into design, so that no problem arises. Therefore, according to the mold clamping system of the present invention, it is possible to provide the maximum clamping force that cable 1.5 to 2.0 times larger than the clamping force determined depending on the ratings of the servo-motor 16.

The above embodiment has thus been described in conjunction with the case where the memory has a single set pattern stored therein. However, several kinds of the set patterns are stored in practice in the memory for the various set clamping force. The set pattern corresponding to a set clamping force is looked up in response to the given set clamping force F0. In addition, the profile value y in the table is calculated with the time interval Ti for the injection process and the set clamping force F0 in the above-mentioned embodiment. However, any time interval other than the time interval Ti for the injection process may be used. Furthermore, the set clamping force F0 does not need to use the maximum clamping force. Moreover, the clamping force may be obtained by using a functional value rather than the table as illustrated in FIG. 4.

As described above, the mold clamping system according to the present invention can provide the maximum clamping force above the clamping force determined depending on the ratings of the servo-motor. This makes it possible to mold a larger molded product as compared with the conventional mold clamping system having the same ratings.

What is claimed is:

1. A control device for a motor-driven mold clamping system, said mold clamping system comprising a servo-motor having a predetermined rated power, and a shaft for converting rotation of the servo-motor into rectilinear motion, the mold clamping system producing a clamping force, wherein the control device comprises:

a pattern generator having a memory, said memory including a plurality of data points, said pattern generator includes means for producing a control signal in response to said data points which at least partially controls operation of said motor and which causes said motor to exceed its predetermined rated power for a specified interval of time.

2. The control device of claim 1, wherein said plurality of data points are stored in said memory as a set pattern in the form of a table in which a plurality of elapsed time intervals measured from the beginning of an injection molding process correspond to a plurality of numerical values between 0 and 1, said numerical values determined based upon a desired clamping force, with a maximum clamping force corresponding to a numerical value of 1.

3. The control device of claim 1, wherein said shaft comprises a ball screw shaft which is coupled to a nut.

4. A control device for a motor-driven mold clamping system, said mold clamping system comprising a servo-motor having a predetermined rated power, and a shaft for converting rotation of the servo-motor into rectilinear motion, the mold clamping system producing a clamping force, wherein the control device comprises:

a pattern generator having a memory, said memory including a plurality of data points, said pattern generator includes means for producing a control signal in response to said data points which controls operation of said servo-motor and which causes said servo-motor to exceed its predetermined rated power for a specified interval of time, said interval of time defined by a time period between the beginning of an injection process and the end of a cooling process in a molding cycle.

5. The control device of claim 4, wherein said plurality of data points are stored in said memory as a set pattern in the form of a table in which a plurality of elapsed time intervals measured from the beginning of an injection molding process correspond to a plurality of numerical values between 0 and 1, said numerical values determined based upon a desired clamping force, with a maximum clamping force corresponding to a numerical value of 1.

6. The control device of claim 4, wherein said servo-motor is capable of generating a first clamping force at said predetermined power rating, said pattern generator including means for producing a control signal which causes said servomotor to exceed said predetermined power rating by a predetermined amount and generate a second clamping force at said predetermined amount, said second clamping force being approximately 1.5 to 2.0 times greater than said first clamping force.

7. The control device of claim 4, wherein said shaft comprises a ball screw shaft which is coupled to a nut.

* * * * *